(12) United States Patent
Ma et al.

(10) Patent No.: US 10,796,129 B2
(45) Date of Patent: Oct. 6, 2020

(54) DISPLAY PANEL WITH FINGERPRINT IDENTIFICATION AND DISPLAY DEVICE

(71) Applicant: Wuhan Tianma Micro-Electronics Co., Ltd., Wuhan (CN)

(72) Inventors: Yangzhao Ma, Wuhan (CN); Tao Peng, Wuhan (CN); Yongzhi Wang, Wuhan (CN)

(73) Assignee: Wuhan Tianma Micro-Electronics Co., Ltd., Wuhan (CN)

(*) Notice: Subject to any disclaimer, the term of this patent is extended or adjusted under 35 U.S.C. 154(b) by 0 days.

(21) Appl. No.: 16/235,436

(22) Filed: Dec. 28, 2018

(65) Prior Publication Data
US 2019/0294849 A1    Sep. 26, 2019

(30) Foreign Application Priority Data

Mar. 26, 2018    (CN) .......................... 2018 1 0251538

(51) Int. Cl.
   *G06K 9/00*    (2006.01)
   *G06F 3/041*    (2006.01)
   *G09G 3/20*    (2006.01)

(52) U.S. Cl.
   CPC ......... *G06K 9/0004* (2013.01); *G06F 3/0412* (2013.01); *G06K 9/00087* (2013.01); *G09G 3/20* (2013.01)

(58) Field of Classification Search
   CPC .............. G06K 9/0004; G06K 9/00087; G06F 3/0412; G09G 3/20
   See application file for complete search history.

(56) References Cited

U.S. PATENT DOCUMENTS

| 2006/0011913 | A1* | 1/2006 | Yamazaki | G06F 3/0412 257/59 |
|---|---|---|---|---|
| 2018/0018496 | A1* | 1/2018 | Hung | G06K 9/00 |
| 2018/0165498 | A1* | 6/2018 | Xie | G06K 9/0004 |
| 2019/0067385 | A1* | 2/2019 | Xu | H01L 27/3244 |

FOREIGN PATENT DOCUMENTS

| CN | 106157891 A | 11/2016 |
|---|---|---|
| CN | 107168586 A | 9/2017 |
| CN | 105867035 A | 12/2017 |
| CN | 107579101 A | 1/2018 |

OTHER PUBLICATIONS

Chinese Office Action for application No. 201810251538.8; reported on Feb. 3, 2020.

* cited by examiner

*Primary Examiner* — Stephen G Sherman
(74) *Attorney, Agent, or Firm* — Miller, Matthias & Hull LLP

(57) ABSTRACT

The present disclosure provides a display panel and a display device. The display panel includes a base substrate, a control circuit layer, formed on the base substrate and the control circuit layer includes a plurality of pixel circuits and a plurality of fingerprint identification circuits with interval dispose; a planarization layer, formed on the control circuit layer; a plurality of fingerprint signal acquisition modules, formed between the control circuit layer and the planarization layer, wherein each of the plurality of fingerprint signal acquisition modules is electrically connected to a respective one of the plurality of fingerprint identification circuits; and a plurality of light-emitting units, formed on the planarization layer, and each of the plurality of light-emitting units is electrically connected to a respective one of the plurality of pixel circuits.

19 Claims, 11 Drawing Sheets

DISPLAY PANEL WITH FINGERPRINT IDENTIFICATION AND DISPLAY DEVICE

CROSS-REFERENCE TO RELATED APPLICATIONS

This application claims priority to Chinese patent application No. 201810251538.8 filed on Mar. 26, 2018, the disclosure of which is incorporated herein by reference in its entirety.

TECHNICAL FIELD

The present disclosure relates to display technologies, and in particular relates to a display panel and a display device with fingerprint identification function.

BACKGROUND

The patterns, breakpoints and intersections of each person's skin texture, including fingerprints, are unique and permanent. Hereby, fingerprint identification technology is to associate a person with his fingerprints by comparing his fingerprints to pre-stored fingerprints data to verify his real identity. Thanks to research of electronic integrated manufacturing technology and fast and reliable algorithms, optical fingerprint identification technology in fingerprint identification technology has begun to enter our daily life and become the most in-depth, widely used and developed technology in biometric identification technology at present.

In related arts, optical fingerprint identification technology is usually combined with display technology to make the display panel not only have normal display functions, but also be capable of carrying out fingerprint identification, which enriches the function of the display panel and improves the safety of the display panel. In order to make the display panel have fingerprint identification functions, it is necessary to add a fingerprint signal acquisition module, a fingerprint identification circuit and a fingerprint identification light source in the display panel. The light emitted by the fingerprint identification light source is reflected by a touching subject and then the reflected light incidents to the fingerprint signal acquisition module for fingerprint identification. The fingerprint signal acquisition module is configured to acquire light of fingerprint signal (that is, the reflected light) and convert it into electrical signal. The fingerprint identification circuit is connected to the fingerprint signal acquisition module and configured to control work states of the fingerprint signal acquisition module.

However, in the display panel in related arts, a major problem faced by the industry is how to overcome the problem of low fingerprint identification accuracy of the display panel and design a display panel with high fingerprint identification accuracy.

SUMMARY

The present disclosure provides a display panel and a display device so as to improve fingerprint identification accuracy of display panel.

In a first aspect, the present disclosure provides a display panel, and the display panel includes: a base substrate, a control circuit layer, a planarization layer, a plurality of fingerprint signal acquisition modules, and a plurality of light-emitting units. The control circuit layer is formed on the base substrate, and the control circuit layer includes a plurality of pixel circuits and a plurality of fingerprint identification circuits disposed in intervals. The planarization layer is formed on the control circuit layer. The plurality of fingerprint signal acquisition modules are formed between the control circuit layer and the planarization layer, and each of the plurality of fingerprint signal acquisition modules is electrically connected to a respective one of the plurality of fingerprint identification circuits. The plurality of light-emitting units are formed on the planarization layer, and each of the plurality of light-emitting units is electrically connected to a respective one of the plurality of pixel circuits.

In a second aspect, the present disclosure further provides a display device, and the display device includes any display panel provided in embodiments of the present disclosure.

Embodiments of the present disclosure, by disposing the fingerprint signal acquisition module between the control circuit layer and the planarization layer and disposing the light-emitting units on the planarization layer, solves the problem of the display panel in related arts that light emitted by the light-emitting units directly radiates the fingerprint signal acquisition module, causing the base signal of at least part of the fingerprint signal acquisition module to increase, affecting the detection of light of the actual fingerprint signal and thus causing low fingerprint identification accuracy of the display panel. Therefore, embodiments of the present disclosure improve the fingerprint identification accuracy of the display panel. In addition, the present disclosure, by embedding the fingerprint identification module in the display panel, realizes the in-cell panel display technology, thereby making the panel have an under-screen fingerprint identification function while have an advantage of being thin. The display panel of the present application is lighter and thinner, and the manufacture technology thereof is simple, which is beneficial to enhance the core competitiveness of the display panel and make great contributions to under-screen fingerprint identification technology.

DETAILED DESCRIPTION

Figure 1:
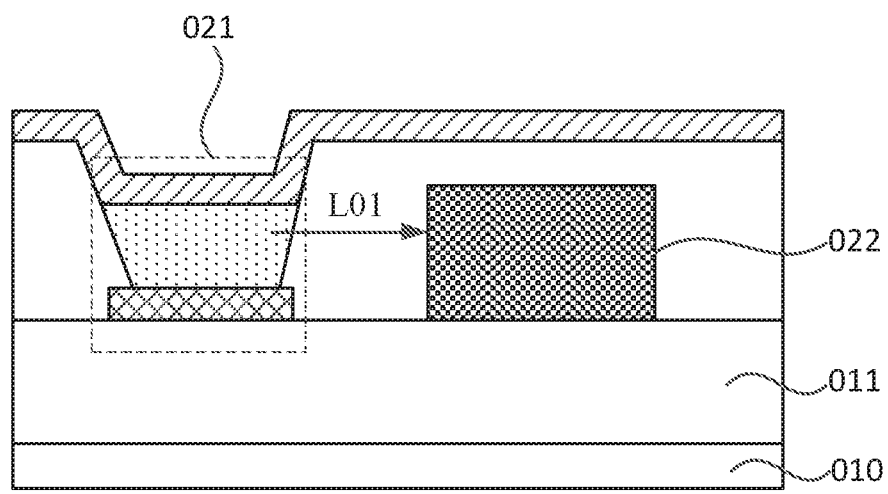
FIG. 1 is a structure diagram of a display panel according to related arts.

The present disclosure is further detailed below in combination with the drawings and embodiments. It should be understood that the specific embodiments described herein are merely used to explain the present disclosure rather than limiting the present disclosure. In addition, it should be stated that in order to facilitate the description, merely a part of structures related to the present disclosure rather than the whole structure are illustrated in the drawings.

FIG. 1 is a structure diagram of a display panel according to related arts. As shown in FIG. 1, the display panel includes a base substrate 010, a planarization layer 011 formed on the base substrate 010, a light-emitting unit 021 and a fingerprint signal acquisition module 022 both formed on the planarization layer 011. In the actual process of image displaying, light L01 emitted from the light-emitting unit 021 along a direction parallel to a light-emitting surface of the display panel directly radiates the fingerprint signal acquisition module 022, so that the light L01 is detected by the fingerprint signal acquisition module 022. Since the light L01 is not the light of the fingerprint signal, comparing with the light of the fingerprint signal, the light L01 is noise, which increases the base signal of a fingerprint identification unit and decreases fingerprint identification accuracy of the display panel.

Figure 2:
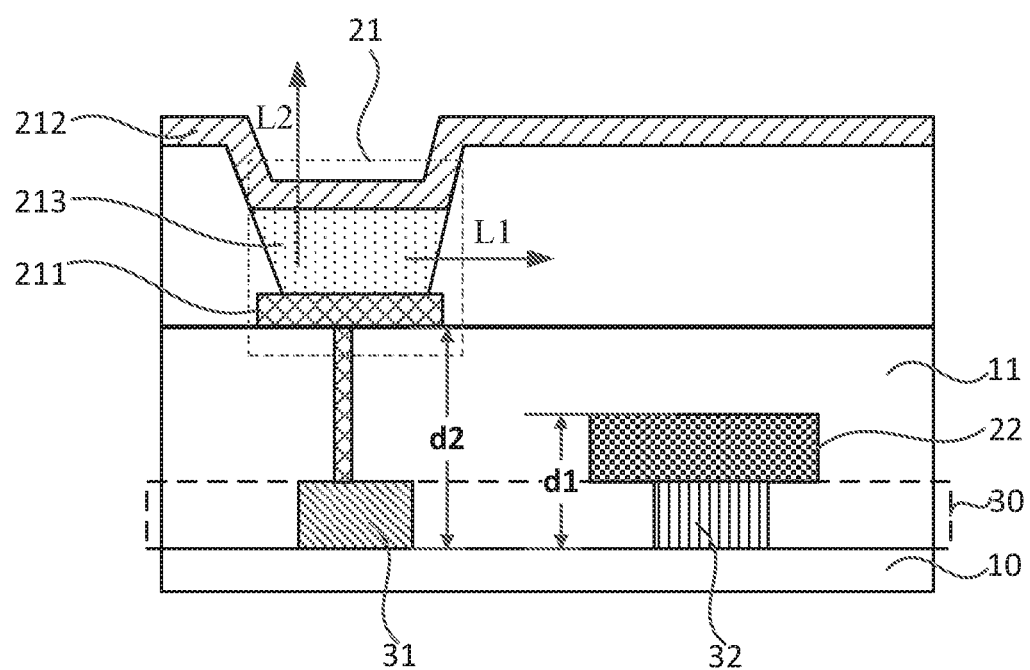
FIG. 2 is a structure diagram of a display panel according to an embodiment of the present disclosure.

The present disclosure provides a display panel. FIG. 2 is a structure diagram of a display panel according to an embodiment of the present disclosure. As shown in FIG. 2, the display panel includes a base substrate 10, a control circuit layer 30, a planarization layer 11, a plurality of fingerprint signal acquisition modules 22 and a plurality of light-emitting units 21. The control circuit layer 30 is formed on the base substrate 10, and the control circuit layer 30 includes a plurality of pixel circuits 31 and a plurality of fingerprint identification circuits 32 disposed in intervals (exemplary, FIG. 2 sets only one pixel circuit 31 and one fingerprint identification circuit 32). The planarization layer 11 is formed on the control circuit layer 30. The plurality of fingerprint signal acquisition modules 22 are formed between the control circuit layer 30 and the planarization layer 11, and each of the plurality of fingerprint signal acquisition modules 22 is electrically connected to a respective one of the plurality of fingerprint identification circuits 32. The plurality of light-emitting units 21 are formed on the planarization layer 11 (exemplary, FIG. 2 sets only one light-emitting unit 21), and each of the plurality of light-emitting units 21 is electrically connected to a respective one of the plurality of pixel circuits 31.

As shown in FIG. 2, a distance between a surface of the fingerprint signal acquisition module 22 facing away from the base substrate 10 and a surface of the base substrate 10 facing to the fingerprint signal acquisition module 22 is set as d1, and a distance between a surface of the light-emitting unit 21 facing to the base substrate 10 and a surface of the base substrate 10 facing to the light-emitting unit 21 is set as d2. The technical solution described above makes d1<d2 by setting the fingerprint signal acquisition module 22 between the control circuit layer 30 and the planarization layer 11 and setting the light-emitting unit 21 on the planarization layer 11. For a display panel of top-emitting type, as a bottom electrode 211 of the light-emitting unit 21 has a characteristic of reflection, the characteristic of reflection limits a direction of propagation of light emitted from the light-emitting unit 21 and makes the light emitted from the light-emitting unit 21 only propagate in a direction from the base substrate 10 to the light-emitting unit 21 (for example, light L2), or the light emitted from the light-emitting unit 21 propagate in a direction parallel to a light-emitting surface of the display panel (for example, light L1). Since neither the light L2 nor the light L1 directly radiates the fingerprint signal acquisition module 22, the light L2 and the light L1 are not collected by the fingerprint signal acquisition module 22, and may not increase the base signal of the fingerprint signal acquisition module 22. The technical solution described above solves the problem of the display panel in related arts that the light emitted from the light-emitting units directly radiates the fingerprint signal acquisition module, causing the base signal of at least part of the fingerprint signal acquisition module to increase, and affects the detection of the light of the actual fingerprint signal and causes low fingerprint identification accuracy of the display panel. The technical solution described above improves the fingerprint identification accuracy of the display panel. In addition, the present disclosure, by embedding the fingerprint identification module in the display panel, realizes the in-cell panel display technology, thereby making the panel have an under-screen fingerprint identification function while having the advantage of being thin. The display of the present application is lighter and thinner, and the manufacture technology thereof is simple, which is beneficial to enhance the core competitiveness of the display panel and makes great contributions to under-screen fingerprint identification technology.

Further referring to FIG. 2, except the bottom electrode 211, the light-emitting unit 21 further includes a top electrode 212 and an emitting material layer 213 disposed between the bottom electrode 211 and the top electrode 212. In one or more embodiments, the bottom electrode 211 is an anode and the top electrode 212 is a cathode, or the bottom electrode 211 is a cathode and the top electrode 212 is an anode.

In one or more embodiments, the display panel further includes a fingerprint identification light source. In an actual arrangement, the light-emitting unit 21 may be reused as the fingerprint identification light source, or an external light source is used as the fingerprint identification light source. There is no limitation in the present disclosure.

Figure 3:
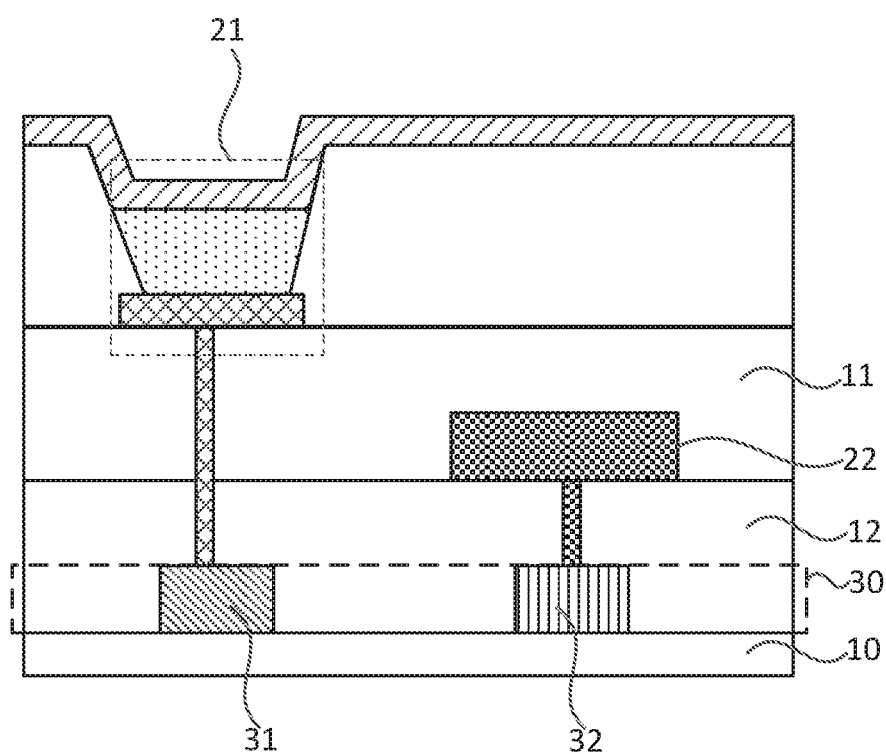
FIG. 3 is a structure diagram of another display panel according to an embodiment of the present disclosure.

FIG. 3 is a structure diagram of another display panel according to an embodiment of the present disclosure. Comparing with FIG. 2, the display panel further includes a first insulating layer. As shown in FIG. 3, the first insulating layer 12 is disposed between the control circuit layer 30 and the plurality of fingerprint signal acquisition modules 22, and a material of the first insulating layer 12 is an inorganic material. In actual manufacturing process, layers and structures disposed on the control circuit layer 30 (for example, the fingerprint signal acquisition module 22) are formed through multiple etching processes, and by disposing the first insulating layer 12 between the control circuit layer 30 and the plurality of fingerprint signal acquisition modules 22, the first insulating layer 12 plays the role of etching barrier, and prevents subsequent etching process from damaging the control circuit layer 30, which affects production yield of the display panel.

In an actual arrangement, the fingerprint signal acquisition module 22 may have a variety of specific structures. The fingerprint signal acquisition modules 22 with different structures have slightly different working principles. The followings are detailed explanations of typical examples, but do not constitute limitations of the present disclosure.

Figure 4:
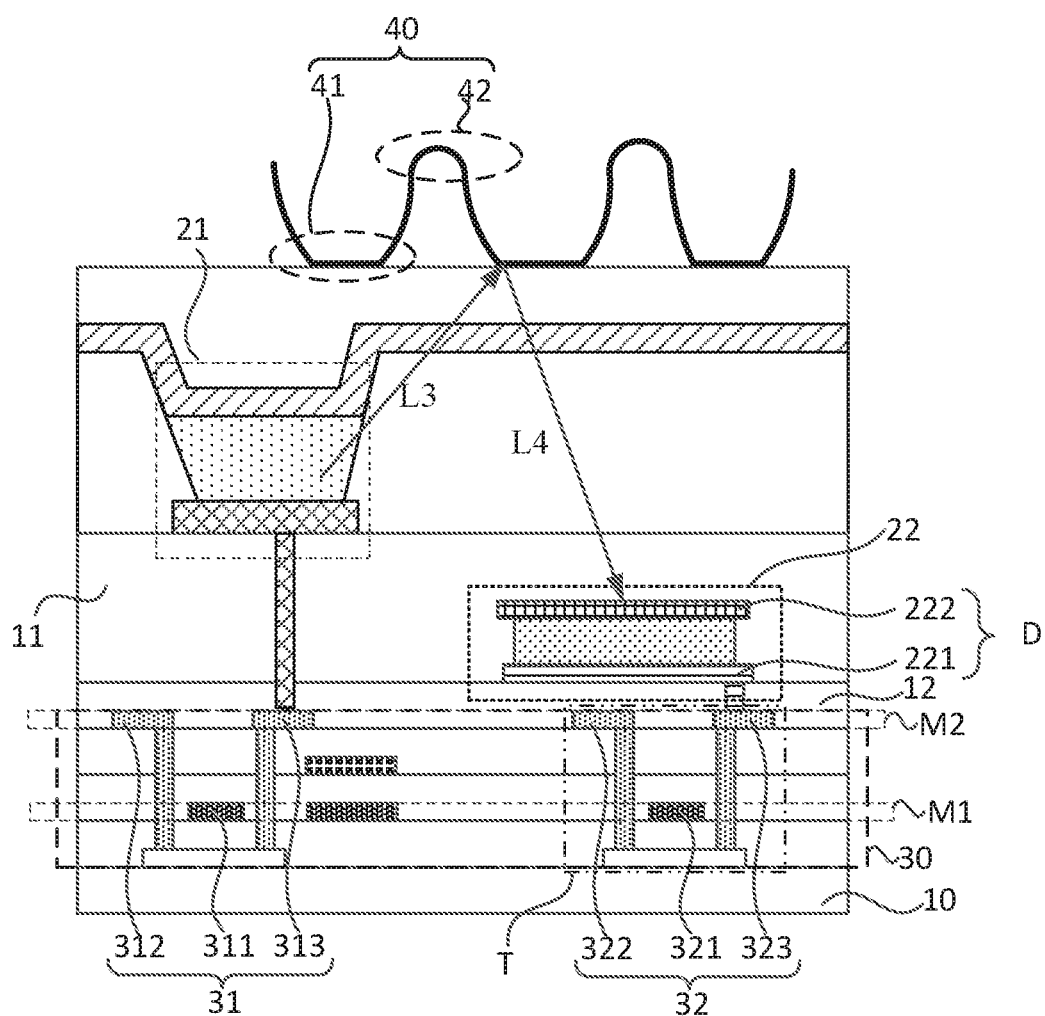
FIG. 4 is a structure diagram of another display panel according to an embodiment of the present disclosure.

FIG. 4 is a structure diagram of another display panel according to an embodiment of the present disclosure. As shown in FIG. 4, in the display panel, each of the plurality of fingerprint signal acquisition modules 22 includes a photo-diode D, and the photo-diode D includes a first electrode 221 and a second electrode 222. The first electrode 221 is disposed between the first insulating layer 12 and the second electrode 222, and the first electrode 221 is electrically connected to a respective one of the plurality of fingerprint identification circuits 32.

Further referring to FIG. 4, the control circuit layer 30 includes a first metal layer M1 and a second metal layer M2, and the first metal layer M1 and the second metal layer M2 are disposed in laminated manner and insulated from each other. The first metal layer M1 is disposed between the second metal layer M2 and the base substrate 10. Each of the plurality of pixel circuits includes a first control switch, and the each of the plurality of fingerprint identification circuits includes a second control switch T. The first control switch includes a first control end 311, a first signal input end 312 and a first signal output end 313. The second control switch T includes a second control end 321, a second signal input end 322 and a second signal output end 323. The first electrode 221 is electrically connected to the second signal output end 323. Each of the plurality of light-emitting units 21 is electrically connected to the first signal output end 313 in the respective one of the plurality of pixel circuits. The first control end 311 and the second control end 321 are disposed at the first metal layer M1. The first signal input end 312, the first signal output end 313 and the second signal input end 322 are disposed at the second metal layer M2. The essence of this arrangement is to make the first control switch and the second control switch T synchronously formed, which does not need to make multiple mask plates for the first control switch and the second control switch T separately, which saves cost, reduces manufacturing process quantity and improves production efficiency.

In an embodiment, the first control switch and the second control switch T may be a thin-film transistor or other structures with switching functions.

Take the case of reusing the light-emitting unit 21 as fingerprint identification light source as an example, as shown in FIG. 4, the following are detailed descriptions of working principles of the fingerprint identification function of the display panel. During the fingerprint identification operation, the second control switch T is switched on, and the first electrode 221 and the second electrode 222 of the photo-diode D are connected to a reverse voltage. When the light L3 emitted by the fingerprint identification light source radiates a touching subject 40 and is reflected by the touching subject 40 to form a reflected light L4, the reflected light L4 (that is, the light of fingerprint signal) is injected into the photo-diode D, forming an optical current, which changes a current value of a circuit where the photo-diode D is located. A value of the optical current may be determined by detecting the current value of the circuit where the optical diode D is located.

Further referring to FIG. 4, when the touching subject 40 (for example, a finger) presses on the display panel, a ridge 41 of the touching subject 40 contacts with a surface of the display panel, a valley 42 of the touching subject 40 do not contact with the surface of the display panel, and a reflectivity of light radiated on the ridge 41 of the touching subject 40 is different from a reflectivity of light radiated on the valley 42 of the touching subject 40. An intensity of a reflected light formed at the ridge 41 of the touching subject 40 is different from an intensity of a reflected light formed at the valley 42 of the touching subject 40, making a value of an optical current converted from the reflected light formed at the ridge 41 of the touching subject 40 is different from a value of an optical current converted from the reflected light formed at the valley 42 of the touching subject 40. The fingerprint identification operation may be performed according to the value of the optical current.

Figure 5:
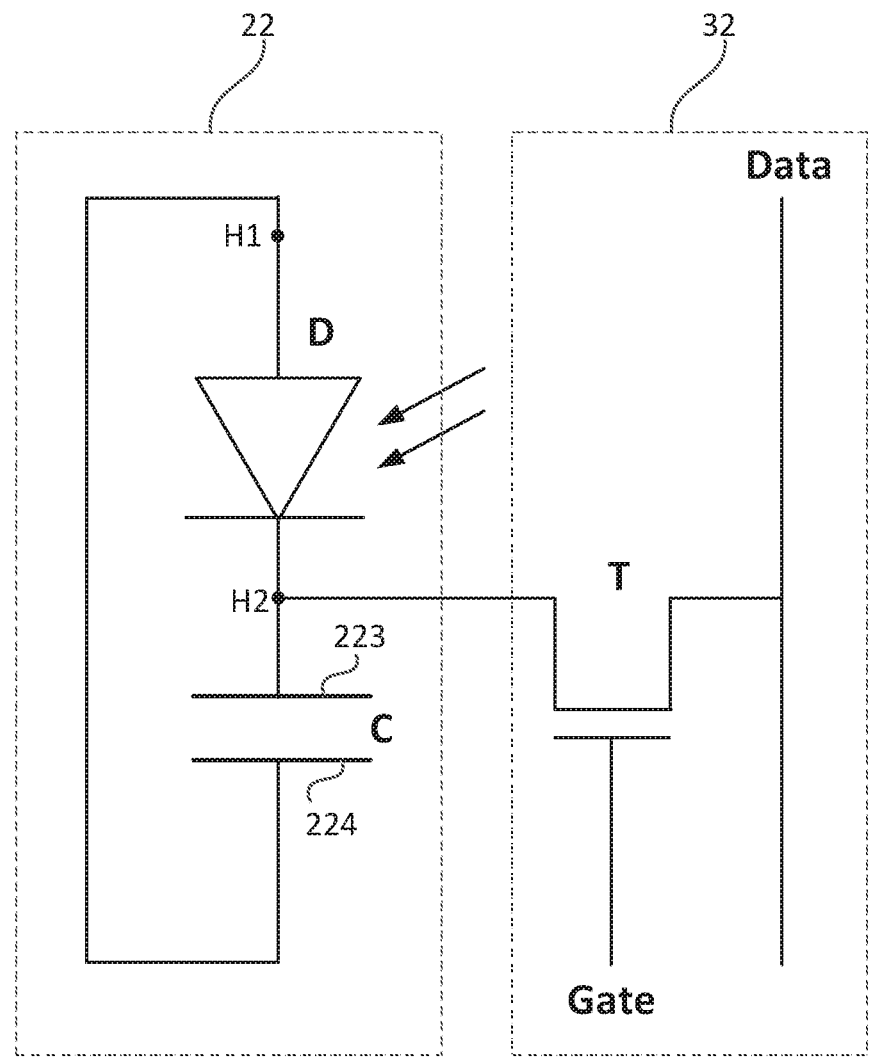
FIG. 5 is an equivalent circuit of a fingerprint signal acquisition module and a fingerprint identification circuit according to an embodiment of the present disclosure.

FIG. 5 is an equivalent circuit of a fingerprint signal acquisition module and a fingerprint identification circuit according to an embodiment of the present disclosure. As shown in FIG. 5, in the display panel, each of the plurality of fingerprint signal acquisition modules 22 further includes a first capacitor C, the first capacitor C includes a third electrode 223 and a fourth electrode 224. The second electrode 222 of the photo-diode D is electrically connected to the third electrode 223, and the first electrode 221 of the photo-diode D is electrically connected to the fourth electrode 224 and the second signal output end of the second control switch T.

It should be noted that the fingerprint signal acquisition module provided in the present disclosure includes the photo-diode D, in some implementation model, the fingerprint signal acquisition module may further include a capacitor electrode (for example, the third electrode) and a through-hole electrically connected to the capacitor electrode. In addition, in an actual arrangement, the fingerprint signal acquisition module may further include a bridge, and the second electrode is electrically connected to the third electrode via the bridge. In addition, it should be noted that the fingerprint signal acquisition module 22 provided in the present disclosure may further include connecting wires disposed between the photo-diode D and the first capacitor, and connecting wires configured to electrically connect the fingerprint identification circuit and the photo-diode D or electrically connect the fingerprint identification circuit and the first capacitor.

Further referring to FIG. 5, the second control end of the second control switch T is electrically connected to a control circuit Gate, the second signal input end is electrically connected to a signal line Data.

In the fingerprint identification stage, a node H1 is input a low voltage signal (for example, a constant voltage signal of −5 v), and the signal line Data is input a high voltage signal (for example, a constant voltage signal of 1.5 v). The whole fingerprint identification stage includes a preparation stage, a fingerprint signal collection stage and a fingerprint signal detection stage. In the preparation stage, the control circuit Gate controls the second control switch T of the fingerprint identification circuit 32 to be on, and the first capacitor C is charged until the charging of the first capacitor C is completed. In the fingerprint signal collection stage, the control circuit Gate is used to control the second control switch T of the fingerprint identification circuit 32 to be off. When a user presses a finger on the display panel, the light emitted by the fingerprint identification light source radiates the finger and is reflected on a surface of a fingerprint of the finger to form reflected light. The reflected light formed by being reflected from the surface of the fingerprint of the finger irradiates into the fingerprint signal acquisition module 22, received by the photo-diode D, forming the optical current. A direction of the optical current is pointed to the node H1 from a node H2, so as to change an electric potential of the node H2. In the fingerprint signal detection stage, a change of the electric potential of the node H2 is detected directly, so as to detect the value of the optical current.

In one or more embodiments, in the fingerprint signal detection stage, the control circuit Gate is further configured to control the second control switch T of the fingerprint identification circuit 32 to be on. At this time, a voltage drop is formed between two electrodes of the first capacitor C, and the first capacitor C is in a charging state. The value of the optical current may be determined by detecting a quantity of electric charge charged into the first capacitor C.

In an actual arrangement, there are several schemes for setting the first capacitor C. For example, a metal layer is added to the display panel to form the third electrode 223 and the fourth electrode 224 of the first capacitor C, or at least one of the third electrode 223 and the fourth electrode 224 is refused with other structures in the display panel. The following takes the fourth electrode 224 being refused with other structures in the display panel as an example, but does not constitute limitations of the present disclosure.

Figure 6:
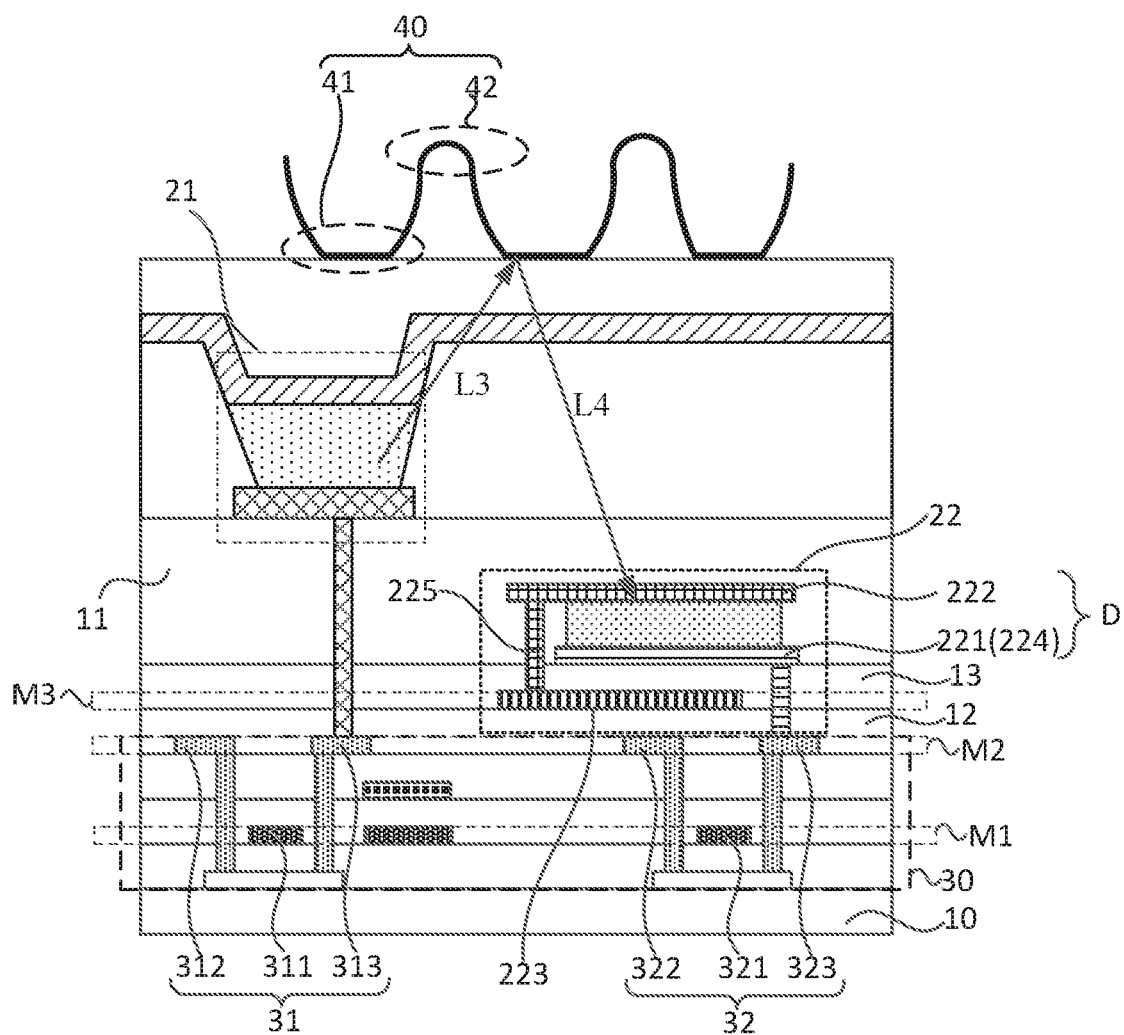
FIG. 6 is a structure diagram of another display panel according to an embodiment of the present disclosure.

Exemplarily, FIG. 6 is a structure diagram of another display panel according to an embodiment of the present disclosure. As shown in FIG. 6, in the display panel, the second signal output end 323 is disposed at the second metal layer M2. A vertical projection of the third electrode 223 on the base substrate 10 is overlapped at least in part with a vertical projection of the first electrode 221 on the base substrate 10. The first electrode 221 is reused as the fourth electrode 224 to make the third electrode 223 and the first electrode 221 constitute jointly the first capacitor. As the first electrode 221 is reused as the fourth electrode 224, it does not need to manufacture the first electrode 221 and the fourth electrode 224 separately. In the manufacturing process, it needs only one etching process, and does not need to manufacture mask plates for the first electrode 221 and the fourth electrode 224 separately, which saves cost, reduces the number of steps and improves production efficiency. This arrangement helps to reduce a thickness of the display panel, comparing with the solution of adding the metal layer to form the fourth electrode 224.

Figure 7:
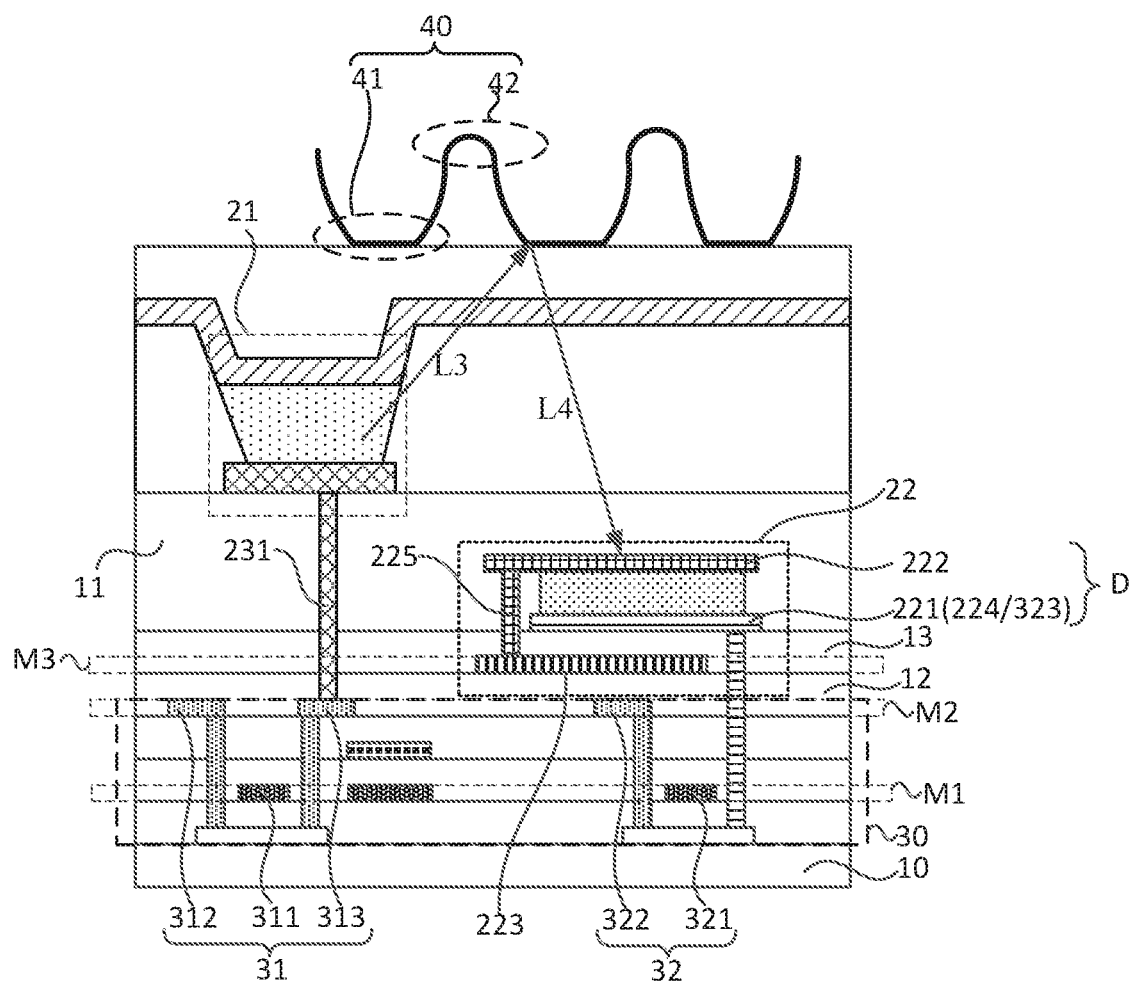
FIG. 7 is a structure diagram of another display panel according to an embodiment of the present disclosure.

FIG. 7 is a structure diagram of another display panel according to an embodiment of the present disclosure. As shown in FIG. 7, in the display panel, a vertical projection of the third electrode 223 on the base substrate 10 is overlapped at least in part with a vertical projection of the first electrode 221 on the base substrate 10. The first electrode 221 is reused as the fourth electrode 224, so that the third electrode 223 and the first electrode 221 constitute the first capacitor, and at the same time the first electrode 221 is reused as the second signal output end 323. As the first electrode 221 is reused as the fourth electrode 224, it does not need to manufacture the first electrode 221 and the fourth electrode 224 separately. In the manufacturing process, it needs only one etching process, and does not need to manufacture mask plates for the first electrode 221 and the fourth electrode 224 separately, which saves cost, reduces the number of steps and improves production efficiency. This arrangement helps to reduce a thickness of the display panel, comparing with the solution of adding the metal layer to form the fourth electrode 224.

In one or more embodiments, further referring to FIG. 6 and FIG. 7, the display panel further includes a second insulating layer 13 and a third metal layer M3, the second insulating layer 13 and the third metal layer M3 are disposed in laminated manner and insulated from each other, and the second insulating layer 13 is disposed between the third metal layer M3 and the first electrode 221. The third metal layer M3 is disposed between the second insulating layer 13 and the first insulating layer 12. The third electrode 223 is disposed at the third metal layer M3. Each of the plurality of fingerprint signal acquisition modules 22 further includes a first through-hole 225, and the second electrode 222 is electrically connected to the third electrode 223 via the first through-hole 225. In the display panel in related arts, lines in the first metal layer M1 and the second metal layer M2 are relatively dense, thus when the third electrode 223 is disposed at the first metal layer M1 and the second metal layer M2, the difficulty of arrangement of the first metal layer M1 and the second metal layer M2 is increased. The difficulty of manufacturing the display panel is fully reduced by adding the third metal layer M3 to the display panel.

In one or more embodiments, a material of the second insulating layer 13 is an inorganic material. In a formula $$C' = \frac{\varepsilon S}{4\pi k d},$$

C' is a capacitance of the first capacitor, ε is a permittivity of the dielectric, which is related to a material of the dielectric, S is an opposite area where the third electrode 223 is opposite to the fourth electrode 224, d is the distance between the third electrode 223 and the fourth electrode 224, and k is an electrostatic constant which is a constant value. When the opposite area S of the third electrode 223 and the fourth electrode 224 is a constant value, the larger the permittivity E, the smaller the distance d between the third electrode 223 and the fourth electrode 224 is. Since a permittivity of the inorganic material is larger than a permittivity of the organic material, and the distance d between the third electrode 223 and the fourth electrode 224 is determined by the second insulating layer 13, setting the material of the second insulating layer 13 as an inorganic material can make the first capacitor have a large capacitance when the thickness of the second insulating layer 13 is small, which is conducive to the development trend of thin display panel.

It should be noted that in FIG. 6 and FIG. 7, each of the plurality of fingerprint signal acquisition modules 22 includes a first through-hole 225, and the second electrode 222 is electrically connected to the third electrode 223 via the first through-hole 225. This is only a specific design proposal for the present disclosure, in an actual arrangement, the fingerprint signal acquisition module 22 may further include the bridge, and the second electrode 222 is electrically connected to the third electrode 223 via the bridge. In addition, it should be noted that the fingerprint signal acquisition module 22 provided in the present disclosure further includes connecting wires disposed between the photo-diode D and the first capacitor, and connecting wires configured to electrically connect the fingerprint identification circuit and the photo-diode D or electrically connect the fingerprint identification circuit and the first capacitor.

Further referring to FIG. 7, in one or more embodiments, the display panel further includes second through-holes 231, where the second through-holes 231 penetrate the planarization layer 11, the second insulating layer 13 and the first insulating layer 12. Each of the plurality of light-emitting units 21 is electrically connected to the first signal output end 313 via a respective one of the second through-holes 231.

The display panel in related arts is usually arranged with at least one first power source signal line (PVDD), each of the at least one first power signal line is disposed on the second metal layer M2, and the at least one first power source signal line is configured to provide a power source voltage signal for the pixel circuit 31 to which the first power source signal line is electrically connected, and drive the light-emitting unit 21 to emit light. The larger the size of the display panel, the longer the length of the first power source signal line is. Due to a resistance of the first power source signal line, the longer the length of the first power signal line, the greater the voltage drop of the power source voltage signal in the first power signal line is, which may lead to different display brightnesses in different areas of the display panel, a poor display uniformity of the display panel and poor display effect.

In one more embodiments, each of the plurality of pixel circuits 31 includes at least one first power source signal line (not shown in drawings), and the at least one first power source signal line is disposed on the second metal layer M2. A plurality of second power source signal lines (not shown in drawings) are disposed on the third metal layer M3. The display panel may further includes third through-holes (not shown in drawings), the third through-holes penetrate the first insulating layer 12, and the at least one first power source signal line is electrically connected to a respective one of the plurality of second power source signal lines via a respective one of the third through-holes. This arrangement is equivalent to the first power source signal line being in parallel with the second power source signal lines. As an equivalent resistance of the paralleled first power source signal line and second power source signal line is less than a resistance of the first power source signal line, it is beneficial to reduce a voltage drop of the power source voltage signal in the first power source signal line, thereby enhancing display uniformity of the display panel and improving display effect of the display panel.

In addition, by disposing a plurality of second power source signal lines on the third metal layer M3, that is, by disposing the plurality of second power source signal lines and the third electrode 223 on the same layer, it needs only one etching process, and does not need to manufacture mask plates for the plurality of second power source signal lines and the third electrode 223 separately, which saves the cost, reduces the number of process and improves the production efficiency. This arrangement helps to reduce a thickness of the display panel.

Figure 8:
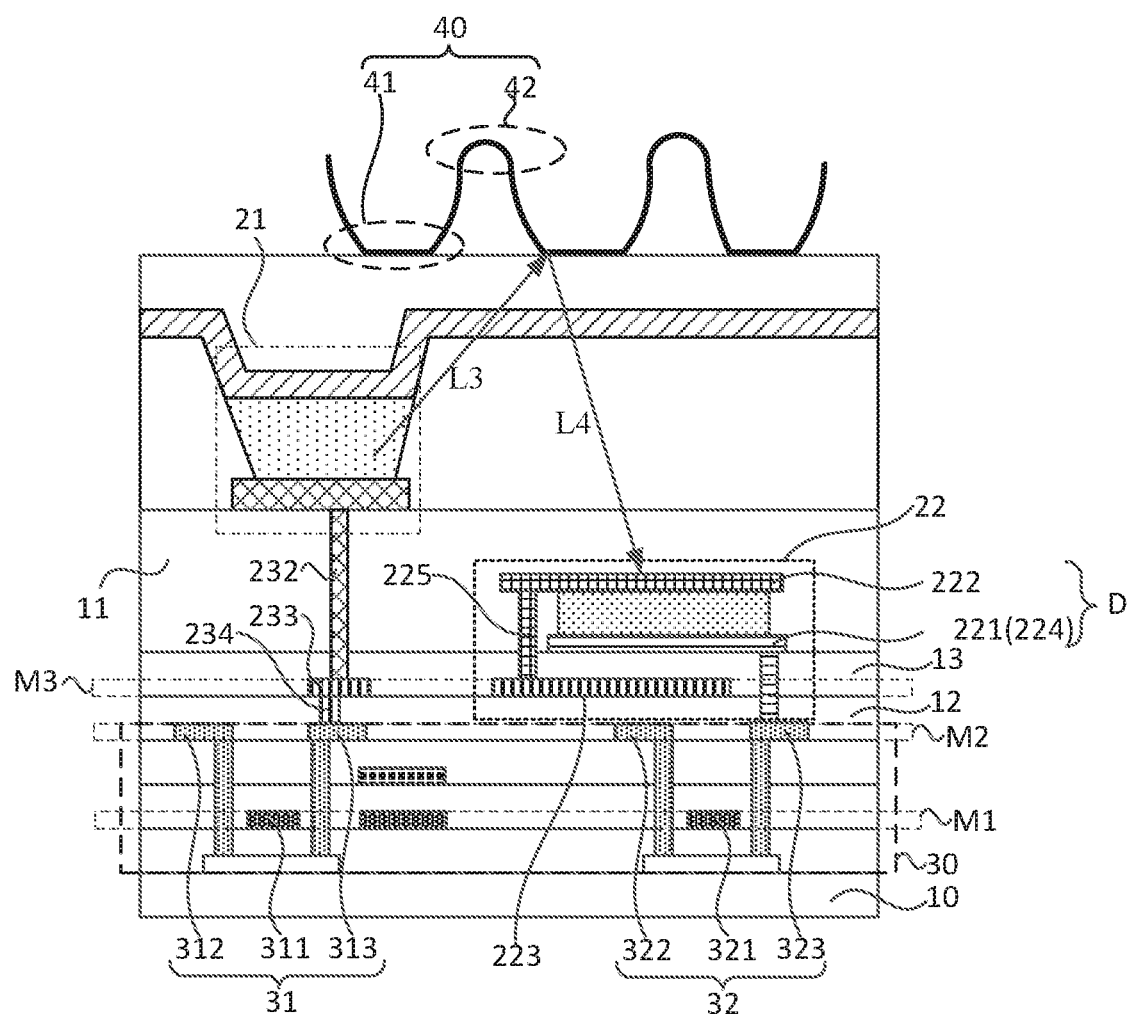
FIG. 8 is a structure diagram of another display panel according to an embodiment of the present disclosure.

FIG. 8 is a structure diagram of another display panel according to an embodiment of the present disclosure. Comparing with FIG. 7, a plurality of auxiliary connection blocks 233 are further disposed between the light-emitting units 21 and the first signal output end 313. In one or more embodiments, as shown in FIG. 8, the display panel further includes fourth through-holes 232, fifth through-holes 234 and a plurality of auxiliary connection blocks 233. The plurality of auxiliary connection blocks 233 are disposed at the third metal layer M3. The fourth through-holes 232 penetrate the planarization layer 11 and the second insulating layer 13, and the fifth through-holes 234 penetrate the first insulating layer 12. Each of the plurality of light-emitting units 21 is electrically connected to a respective one of the plurality of auxiliary connection blocks 233 via a respective one of the fourth through-holes 232, and each of the plurality of auxiliary connection blocks 233 is electrically connected to the first signal input end 313 in the respective one of the plurality of pixel circuits via a respective one of the fifth through-holes 234. The essence of this arrangement is that the etching process is divided into two to form through-holes configured to electrically connect the each of the plurality of light-emitting units 21 with a corresponding first signal output end 313, which can reduce the difficulty of manufacturing the display panel. In addition, to dispose the plurality of auxiliary connection blocks 233 at the third metal layer M3, that is, to dispose the plurality of auxiliary connection blocks 233, the plurality of second power source signal lines and the third electrode 223 on the same layer, it needs only one etching process, and does not need to manufacture mask plates for the plurality of auxiliary connection blocks 233, the plurality of second power source signal lines and the third electrode 223 separately, which saves cost, reduces the number of steps and improves production efficiency. This arrangement helps to reduce a thickness of the display panel.

In one or more embodiments, concerning that in order to make the capacitance of the first capacitor of the fingerprint signal acquisition module 22 be bigger, the first third electrode 223 and the fourth electrode 224 are often configured to have a larger area, which makes an overlapped area of the vertical projection of the third electrode 223 on the base substrate 10 and the vertical projection of the pixels circuit 31 adjacent to the third electrode 223 on the base substrate 10 be larger, thus enhancing the coupling effect between the third electrode 223 and the pixels circuit adjacent to the third electrode 223, and further influencing the display effect of the display panel.

Figure 9:
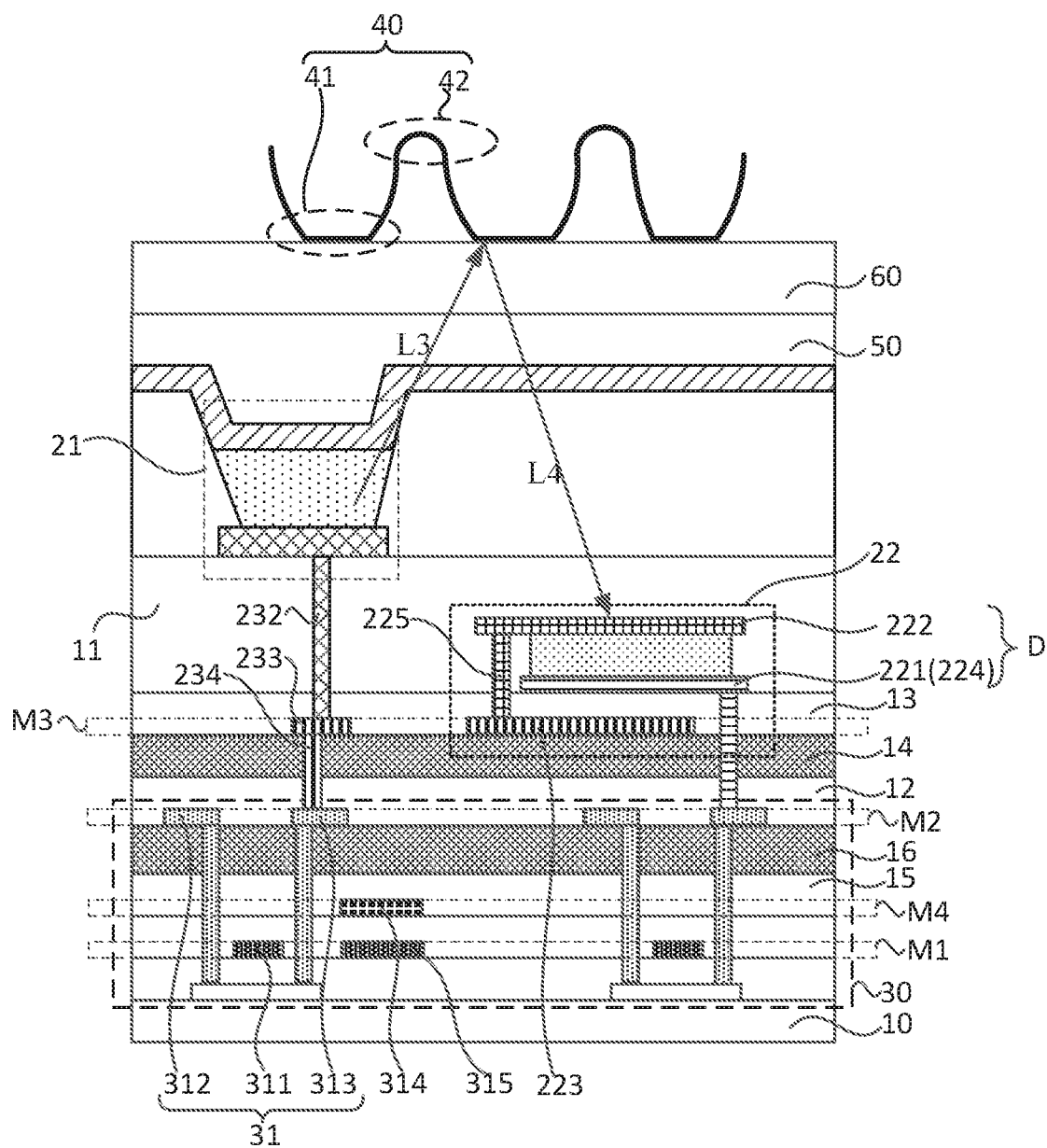
FIG. 9 is a structure diagram of another display panel according to an embodiment of the present disclosure.

In one or more embodiments, FIG. 9 is a structure diagram of another display panel according to an embodiment of the present disclosure. As shown in FIG. 9, on the basis of the technical solutions described above, the display panel further includes a third insulating layer 14. The third insulating layer 14 is disposed between the first insulating layer 12 and the third metal layer M3, and a material of the third insulating layer 14 is an organic material. Through an arrangement of the third insulation layer 14, the coupling effect of the third electrode 223 and the pixel circuit 31 adjacent to the third electrode 223 may be fully reduced, and the interference of fingerprint signal acquisition module 22 on the pixel circuit 31 may be reduced, so as to improve the display effect of the display panel.

Further referring to FIG. 9, in one or more embodiments, the control circuit layer 30 further includes a fourth metal layer M4, and the fourth metal layer M4 is disposed between the first metal layer M1 and the second metal layer M2. Each of the plurality of pixel circuits 31 includes a second capacitor. The second capacitor includes a fifth electrode 314 and a sixth electrode 315, the fifth electrode 314 is disposed at the fourth metal layer M4, and the sixth electrode 315 is disposed at the first metal layer M1.

Figure 10:
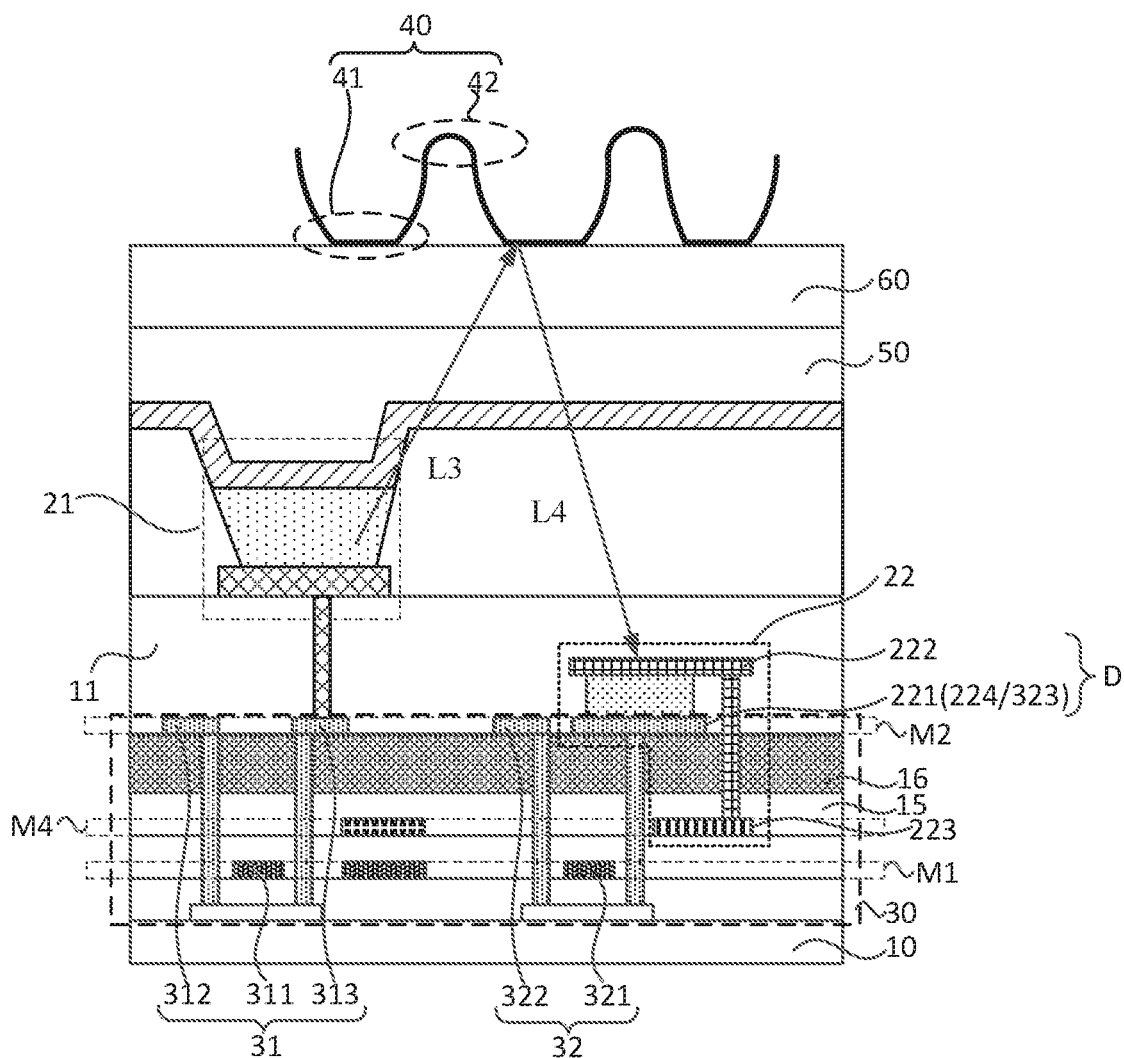
FIG. 10 is a structure diagram of another display panel according to an embodiment of the present disclosure.

FIG. 10 is a structure diagram of another display panel according to an embodiment of the present disclosure. In one or more embodiments, as shown in FIG. 10, the third electrode 223 is further disposed at the fourth metal layer M4, and the vertical projection of the third electrode 223 on the base substrate 10 is overlapped at least in part with the vertical projection of the first electrode 221 on the base substrate 10. The first electrode 221 is reused as the fourth electrode 224, the third electrode 223 and the first electrode 221 constitute the first capacitor, and the first electrode 221 is reused as the second signal output end at the same time. In this way, the light emitted by the light-emitting unit 21 is not directly collected by the fingerprint signal acquisition module 22, does not cause the increase of the base signal of the fingerprint signal acquisition module 22, and improves the fingerprint identification accuracy of the display panel.

In addition, to dispose the third electrode 223 at the fourth metal layer M4, that is, to dispose the third electrode 223 and the fifth electrode 314 on the same layer, it needs only one etching process, and does not need to manufacture mask plates for the third electrode 223 and the fifth electrode 314, which saves cost, reduces the number of steps and improves production efficiency. This arrangement helps to reduce a thickness of the display panel. It should be noted that in some implementation models, the second electrode 222 is disposed at the third metal layer M3. The present disclosure is not limited to theses specific embodiments, as circumstances may vary.

On the basis of technical solutions described above, a flexible display panel needs to be highly flexible. In one or more embodiments, further referring to FIG. 9 and FIG. 10, the control circuit layer 30 further includes a fourth insulating layer 15 and a fifth insulating layer 16, with the fourth insulating layer 15 and the fifth insulating layer 16 being disposed in laminated manner. The fourth insulating layer 15 is disposed between the fourth metal layer M4 and the fifth insulating layer 16, and the fifth insulating layer 16 is disposed between the fourth insulating layer 15 and the second metal layer M2. A material of the fourth insulating layer 15 is an inorganic material, and a material of the fifth insulating layer 16 is an organic material. The reason for this arrangement is that in the manufacturing process of the pixel circuit 31 and fingerprint identification circuit 32, it needs to perform graphical processing for multiple layers (for example the first metal layer M1 and the fourth metal layer M4) separately, and areas of graphical processing in different layers are different from each other, so after forming the fourth insulating layer 15 and before forming the second metal layer M2, a surface of the control circuit layer 30 facing away from the base substrate 20 is uneven. Through disposing the fifth insulating layer 16, it may fill the surface of the control circuit layer 30 facing away from the base substrate 10, playing a role of planarization, and improving flexural endurance of the flexible display panel.

Further referring to FIG. 9 and FIG. 10, in one or more embodiments, the display panel further includes a film sealing layer 50, and the film sealing layer 50 is disposed on a side of the each of the plurality of light-emitting units 21 facing away from the base substrate 10. As the light-emitting units 21 are highly sensitive to corrosion of water vapor and oxygen, the arrangement may prevent water vapor and oxygen from entering the display panel and extend the service life of the display panel.

In one or more embodiments, the display panel further includes a contact electrode layer 60. The contact electrode layer 60 is disposed on a side of the film sealing layer 50 facing away from the each of the plurality of light-emitting units 21. This arrangement may make the display panel have touch control function concurrently, satisfy user diversification demand, and improve user experience.

Figure 11:
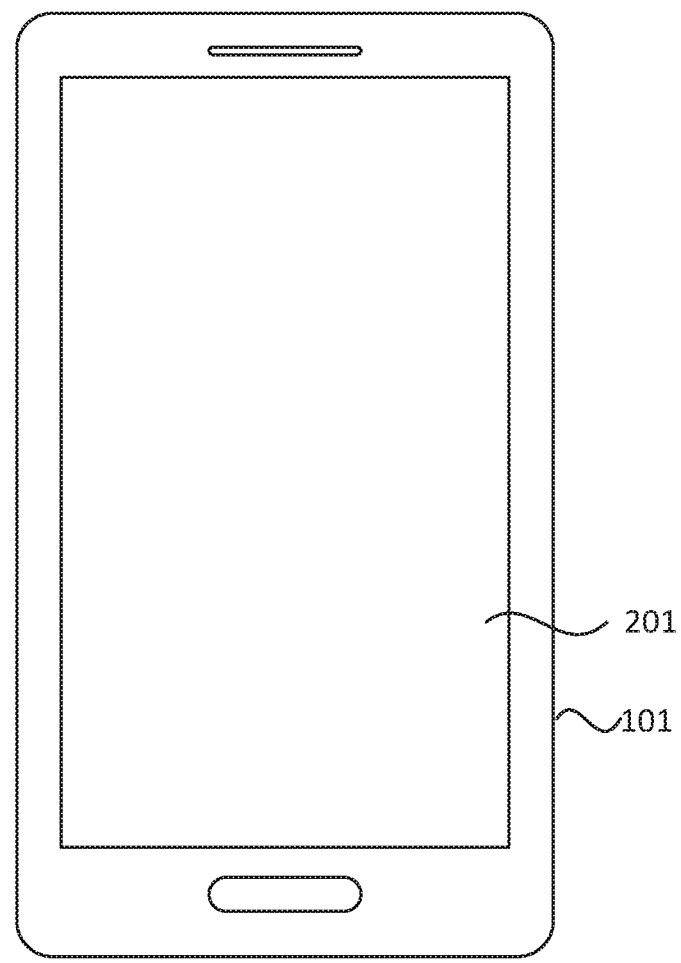
FIG. 11 is a structure diagram of a display device according to an embodiment of the present disclosure.

FIG. 11 is a structure diagram of a display device according to an embodiment of the present disclosure. As shown in FIG. 11, the display device 201 provided in embodiments of the present disclosure includes any display panel 101 provided in embodiments described above.

The display device 201 described above may be a mobile phone, a tablet, a smart wearable or an electronic photo frame, and the like.

The display device provided in embodiments of the present disclosure, by disposing the fingerprint signal acquisition module between the control circuit layer and the planarization layer and disposing the light-emitting units on the planarization layer, solves the problem of the display panel in related arts that light emitted by the light-emitting units directly radiates the fingerprint signal acquisition module, causing the base signal of at least part of the fingerprint signal acquisition module to increase, thereby affecting the detection of the actual fingerprint signal, and thus causing low fingerprint identification accuracy of the display panel. Therefore, the display device provided in embodiments of the present disclosure improves the fingerprint identification accuracy of the display panel. In addition, the present disclosure, by embedding the fingerprint identification module in the display panel, realizes the in-cell panel display technology, thereby making the panel have an under-screen fingerprint identification function while having the advantage of being thin. The display panel of the present application is lighter and thinner, and the manufacture technology thereof is simple, which is beneficial to enhance the core competitiveness of the display panel and makes great contributions to under-screen fingerprint identification technology.

It should be noted that the above contents are only preferred embodiments of the present disclosure and its technical principles. It can be understood for those skilled in the art that the present disclosure is not limited to specific embodiments described herein. For those skilled in the art, the present disclosure can be subject to various apparent variations, readjustments and replacements without departing from a protection scope of the present disclosure. Therefore, although the present disclosure is described in detail through above embodiments, the present disclosure is not only limited to above embodiments. The present disclosure can also include more other equivalent embodiments without deviating from conceptions of the present disclosure. A scope of the present disclosure is determined by a scope of attached claims.

What is claimed is:

1. A display panel with fingerprint identification function, comprising:
   a base substrate;
   a control circuit layer formed on the base substrate, wherein the control circuit layer comprises a plurality of pixel circuits and a plurality of fingerprint identification circuits with interval dispose;
   a planarization layer formed on the control circuit layer;
   a plurality of fingerprint signal acquisition modules, formed between the control circuit layer and the planarization layer, wherein each of the plurality of fingerprint signal acquisition modules is electrically connected to a respective one of the plurality of fingerprint identification circuits;
   a plurality of light-emitting units, formed on the planarization layer, wherein each of the plurality of light-emitting units is electrically connected to a respective one of the plurality of pixel circuits; and
   a first insulating layer, wherein the first insulating layer is disposed between the control circuit layer and the plurality of fingerprint signal acquisition modules, and a material of the first insulating layer is an inorganic material;
   wherein the each of the plurality of fingerprint signal acquisition modules comprises a photo-diode, and the photo-diode comprises a first electrode and a second electrode; and wherein the first electrode is disposed between the first insulating layer and the second electrode, and the first electrode is electrically connected to the respective one of the plurality of fingerprint identification circuits;
   wherein the control circuit layer comprises a first metal layer and a second metal layer, and the first metal layer and the second metal layer are disposed in laminated manner and insulated from each other;
   the first metal layer is disposed between the second metal layer and the base substrate;
   each of the plurality of pixel circuits comprises a first control switch, and the each of the plurality of fingerprint identification circuits comprises a second control switch;
   the first control switch comprises a first control end, a first signal input end and a first signal output end;

the second control switch comprises a second control end, a second signal input end and a second signal output end;

the first electrode is electrically connected to the second signal output end;

the each of the plurality of light-emitting units is electrically connected to the first signal output end in the respective one of the plurality of pixel circuits;

the first control end and the second control end are disposed at the first metal layer;

the first signal input end, the first signal output end and the second signal input end are disposed at the second metal layer;

wherein the each of the plurality of fingerprint signal acquisition modules further comprises a first capacitor, the first capacitor comprises a third electrode and a fourth electrode;

the second electrode is electrically connected to the third electrode, and the first electrode is electrically connected to the fourth electrode and the second signal output end;

wherein, the second signal output end is disposed at the second metal layer;

a vertical projection of the third electrode on the base substrate is overlapped at least in part with a vertical projection of the first electrode on the base substrate; and the first electrode is reused as the fourth electrode, and the third electrode and the first electrode constitute the first capacitor.

2. The display panel according to claim 1, further comprising: a second insulating layer and a third metal layer, wherein, the second insulating layer and the third metal layer are disposed in laminated manner and insulated from each other, the second insulating layer is disposed between the third metal layer and the first electrode;

the third metal layer is disposed between the second insulating layer and the first insulating layer;

the third electrode is disposed at the third metal layer; and the each of the plurality of fingerprint signal acquisition modules further comprises a first through-hole, the second electrode is electrically connected to the third electrode via the first through-hole.

3. The display panel according to claim 2, wherein a material of the second insulating layer is an inorganic material.

4. The display panel according to claim 1, further comprising second through-holes, wherein, the second through-holes penetrate the planarization layer, the second insulating layer and the first insulating layer; and the each of the plurality of light-emitting units is electrically connected to the first signal output end via a respective one of the second through-holes.

5. The display panel according to claim 1, wherein the each of the plurality of pixel circuits comprises at least one first power source signal line, the at least one first power source signal line is disposed on the second metal layer;

a plurality of second power source signal lines are disposed on the third metal layer; and the display panel further comprises third through-holes, the third through-holes penetrate the first insulating layer, and the at least one first power source signal line is electrically connected to a respective one of the plurality of second power source signal lines via a respective one of the third through-holes.

6. The display panel according to claim 5, further comprising fourth through-holes, fifth through-holes and a plurality of auxiliary connection blocks, wherein, the plurality of auxiliary connection blocks are disposed at the third metal layer;

the fourth through-holes penetrate the planarization layer and the second insulating layer, and the fifth through-holes penetrate the first insulating layer; and the each of the plurality of light-emitting units is electrically connected to a respective one of the plurality of auxiliary connection blocks via a respective one of the fourth through-holes, and each of the plurality of auxiliary connection blocks is electrically connected to the first signal input end in the respective one of the plurality of pixel circuits via a respective one of the fifth through-holes.

7. The display panel according to claim 1, further comprising a third insulating layer, wherein, the third insulating layer is disposed between the first insulating layer and the third metal layer; and a material of the third insulating layer is an organic material.

8. The display panel according to claim 1, wherein the control circuit layer further comprises a fourth metal layer, and the fourth metal layer is disposed between the first metal layer and the second metal layer;

the each of the plurality of pixel circuits comprises a second capacitor; and the second capacitor comprises a fifth electrode and a sixth electrode, the fifth electrode is disposed at the fourth metal layer, and the sixth electrode is disposed at the first metal layer.

9. The display panel according to claim 8, wherein the control circuit layer further comprises a fourth insulating layer and a fifth insulating layer, the fourth insulating layer and the fifth insulating layer are disposed in laminated manner;

the fourth insulating layer is disposed between the fourth metal layer and the fifth insulating layer, the fifth insulating layer is disposed between the fourth insulating layer and the second metal layer; and a material of the fourth insulating layer is an inorganic material, and a material of the fifth insulating layer is an organic material.

10. The display panel according to claim 1, further comprising a film sealing layer;

wherein the film sealing layer is disposed on a side of the each of the plurality of light-emitting units facing away from the base substrate.

11. The display panel according to claim 10, further comprising a contact electrode layer;

wherein the contact electrode layer is disposed on a side of the film, sealing layer facing away from the each of the plurality of light-emitting units.

12. A display device with fingerprint identification function, comprising a display panel with fingerprint identification function, wherein the display panel comprises:

a base substrate;

a control circuit layer formed on the base substrate, wherein the control circuit layer comprises a plurality of pixel circuits and a plurality of fingerprint identification circuits with interval dispose;

a planarization layer formed on the control circuit layer;

a plurality of fingerprint signal acquisition modules, formed between the control circuit layer and the planarization layer, wherein each of the plurality of fingerprint signal acquisition modules is electrically connected to a respective one of the plurality of fingerprint identification circuits;
a plurality of light-emitting units, formed on the planarization layers wherein each of the plurality of light-emitting units is electrically connected to a respective one of the plurality of pixel circuits; and
a first insulating layer, wherein the first insulating layer is disposed between the control circuit layer and the plurality of fingerprint signal acquisition modules, and a material of the first insulating layer is an inorganic material;
wherein the each of the plurality of fingerprint signal acquisition modules comprises a photo-diode and the photo-diode comprises a first electrode and a second electrode; and wherein the first electrode is disposed between the first insulating layer and the second electrode, and the first electrode is electrically connected to the respective one of the plurality of fingerprint identification circuits;
wherein the control circuit layer comprises a first metal layer and a second metal layer, and the first metal layer and the second metal layer are disposed in laminated manner and insulated from each other;
the first metal layer is disposed between the second metal layer and the base substrate;
each of the plurality of pixel circuits comprises a first control switch, and the each of the plurality of fingerprint identification circuits comprises a second control switch;
the first control switch comprises a first control end, a first signal input end and a First signal output end;
the second control switch comprises a second control end, a second signal input end and a second sisal output end;
the first electrode is electrically connected to the second signal output end;
the each of the plurality of light-emitting units is electrically connected to the first signal output end in the respective one of the plurality of pixel circuits;
the first control end and the second control end are disposed at the first metal layer;
the first signal input end, the first signal output end and the second signal input end are disposed at the second metal layer;
wherein the each of the plurality of fingerprint signal acquisition modules further comprises a first capacitor, the first capacitor comprises a third electrode and a fourth electrode;
the second electrode is electrically connected to the third electrode, and the first electrode is electrically connected to the fourth electrode and the second signal output end;
wherein, the second signal output end is disposed at the second metal layer; a vertical projection of the third electrode on the base substrate is overlapped at least in part with a vertical projection of the first electrode on the base substrate; and
the first electrode is reused as the fourth electrode, and the third electrode and the first electrode constitute the first capacitor.

13. A display panel with fingerprint identification function, comprising:
a base substrate;
a control circuit layer formed on the base substrate, wherein the control circuit layer comprises a plurality of pixel circuits and a plurality of fingerprint identification circuits with interval dispose;
a planarization layer formed on the control circuit layer;
a plurality of fingerprint signal acquisition modules, formed between the control circuit layer and the planarization layer, wherein each of the plurality of fingerprint signal acquisition modules is electrically connected to a respective one of the plurality of fingerprint identification circuits;
a plurality of light-emitting units, formed on the planarization layer, wherein each of the plurality of light-emitting units is electrically connected to a respective one of the plurality of pixel circuits; and
a first insulating layer, wherein the first insulating layer is disposed between the control circuit layer and the plurality of fingerprint signal acquisition modules, and a material of the first insulating layer is an inorganic material;
wherein the each of the plurality of fingerprint signal acquisition modules comprises a photo-diode, and the photo-diode comprises a first electrode and a second electrode; and
wherein the first electrode is disposed between the first insulating layer and the second electrode, and the first electrode is electrically connected to the respective one of the plurality of fingerprint identification circuits;
wherein the control circuit layer comprises a first metal layer and a second metal layer, and the first metal layer and the second metal layer are disposed in laminated manner and insulated from each other;
the first metal layer is disposed between the second metal layer and the base substrate;
each of the plurality of pixel circuits comprises a first control switch, and the each of the plurality of fingerprint identification circuits comprises a second control switch;
the first control switch comprises a first control end, a first signal input end and a first signal output end;
the second control switch comprises a second control end, a second signal input end and a second signal output end;
the first electrode is electrically connected to the second signal output end;
the each of the plurality of light-emitting units is electrically connected to the first signal output end in the respective one of the plurality of pixel circuits;
the first control end and the second control end are disposed at the first metal layer;
the first signal input end, the first signal output end and the second signal input end are disposed at the second metal layer;
wherein the each of the plurality of fingerprint signal acquisition modules further comprises a first capacitor, the first capacitor comprises a third electrode and a fourth electrode;
the second electrode is electrically connected to the third electrode, and the first electrode is electrically connected to the fourth electrode and the second signal output end;
wherein, a vertical projection of the third electrode on the base substrate is overlapped at least in part with a vertical projection of the first electrode on the base substrate; and
the first electrode is reused as the fourth electrode, the third electrode and the first electrode constitute the first capacitor, and the first electrode is reused as the second signal output end.

14. The display panel according to claim 13, wherein the each of the plurality of pixel circuits comprises at least one first power source signal line, the at least one first power source signal line is disposed on the second metal layer;

a plurality of second power source signal lines are disposed on the third metal layer; and the display panel further comprises third through-holes, the third through-holes penetrate the first insulating layer, and the at least one first power source signal line is electrically connected to a respective one of the plurality of second power source signal lines via a respective one of the third through-holes.

15. The display panel according to claim 13, further comprising a third insulating layer, wherein, the third insulating layer is disposed between the first insulating layer and the third metal layer; and a material of the third insulating layer is an organic material.

16. The display panel according to claim 13, wherein the control circuit layer further comprises a fourth metal layer, and the fourth metal layer is disposed between the first metal layer and the second metal layer;

the each of the plurality of pixel circuits comprises a second capacitor; and the second capacitor comprises a fifth electrode and a sixth electrode, the fifth electrode is disposed at the fourth metal layer, and the sixth electrode is disposed at the first metal layer.

17. The display panel according to claim 16, wherein the control circuit layer further comprises a fourth insulating layer and a fifth insulating layer, the fourth insulating layer and the fifth insulating layer are disposed in laminated manner;

the fourth insulating layer is disposed between the fourth metal layer and the fifth insulating layer, the fifth insulating layer is disposed between the fourth insulating layer and the second metal layer; and a material of the fourth insulating layer is an inorganic material, and a material of the fifth insulating layer is an organic material.

18. The display panel according to claim 13, further comprising a film sealing layer;

wherein the film sealing layer is disposed on a side of the each of the plurality of light-emitting units facing away from the base substrate.

19. The display panel according to claim 18, further comprising a contact electrode layer;

wherein the contact electrode layer is disposed on a side of the film sealing layer facing away from the each of the plurality of light-emitting, units.

* * * * *